United States Patent
Hanazaki et al.

[19]

[11] Patent Number: 5,911,936
[45] Date of Patent: *Jun. 15, 1999

[54] PROCESS FOR PRODUCING RADIATOR SUPPORT

[75] Inventors: Masahiko Hanazaki, Nagoya; Kohei Hori, Aichi-ken; Masayuki Shikuya, Nissin, all of Japan

[73] Assignee: Tokai Rubber Industries, Ltd., Komaki, Japan

[ * ] Notice: This patent is subject to a terminal disclaimer.

[21] Appl. No.: 08/773,322

[22] Filed: Dec. 24, 1996

[30] Foreign Application Priority Data

Dec. 27, 1995 [JP] Japan ................................ 7-353300

[51] Int. Cl.$^6$ .......................... B29C 33/42; B29C 39/12; F16M 13/00
[52] U.S. Cl. ....................... 264/250; 248/634; 264/266; 264/274; 264/275; 264/279
[58] Field of Search .................................. 248/634, 635, 248/55, 56; 180/68.4; 297/141–141.5; 403/227, 228, 225, 220; 264/250, 266, 274, 275, 279

[56] References Cited

U.S. PATENT DOCUMENTS

| | | | |
|---|---|---|---|
| 2,273,869 | 2/1942 | Julien ........................................ | 248/22 |
| 3,608,049 | 8/1971 | Tavella ..................................... | 264/229 |
| 4,139,246 | 2/1979 | Mikoshiba et al. ....................... | 308/26 |
| 4,651,839 | 3/1987 | Isobe ....................................... | 180/68.4 |
| 4,858,866 | 8/1989 | Werner ................................... | 248/213.3 |
| 5,170,985 | 12/1992 | Killworth et al. ....................... | 248/635 |
| 5,758,860 | 6/1998 | Hanazaki et al. ....................... | 248/634 |

FOREIGN PATENT DOCUMENTS

60-11317   3/1985   Japan .

Primary Examiner—Catherine Timm
Assistant Examiner—Suzanne E. Mason
Attorney, Agent, or Firm—Oblon, Spivak, McClelland, Maier & Neustadt, P.C.

[57] ABSTRACT

A process for producing a radiator support, disposed between a radiator and a vehicle-side installation member, includes the steps of molding a rubber-elastic member, disposing the resulting rubber-elastic member in a mold, and completing a radiator support by injecting a resinous material into the mold. In the rubber-elastic member molding step, a rubber-elastic member is molded to include a rubber flange which has a top surface and a bottom surface. In the radiator support completing step, a rigid inner tube member and a rigid outer tube member are molded integrally with the rubber-elastic member, wherein the rigid outer tube member is molded so as to include a flange which has a top surface superimposed on the bottom surface of the rubber flange of the rubber-elastic member, a bottom surface, and a cut-off. The cut-off downwardly exposes a portion of the bottom surface of the rubber flange of the rubber elastic-member in a completed radiator support. In the radiator support completing step, the downwardly-exposed portion of the rubber flange of the rubber-elastic member is held by the mold. Hence, it is possible to effectively inhibit the rubber-elastic member from being put out of position in the mold, and from being deformed by the injection pressure of the resinous material.

24 Claims, 9 Drawing Sheets

PROCESS FOR PRODUCING RADIATOR SUPPORT

BACKGROUND OF THE INVENTION

1. Field of the Invention

The present invention relates to a process for producing a radiator support. The resulting radiator support can be disposed between a radiator and a vehicle-side installation member to elastically support the radiator.

2. Description of the Related Art

A radiator support is disposed between a radiator and a vehicle-side installation member, and accordingly supports the radiator elastically in a floating manner. The radiator support utilizes the radiator as an inertial mass in order to suppress the vibrations of a vehicle body.

As disclosed in Japanese Examined Patent Publication (KOKOKU) No. 60-11,317, such a radiator support has been known. For example, a conventional radiator support is constructed as illustrated in FIG. 9.

Figure 9:
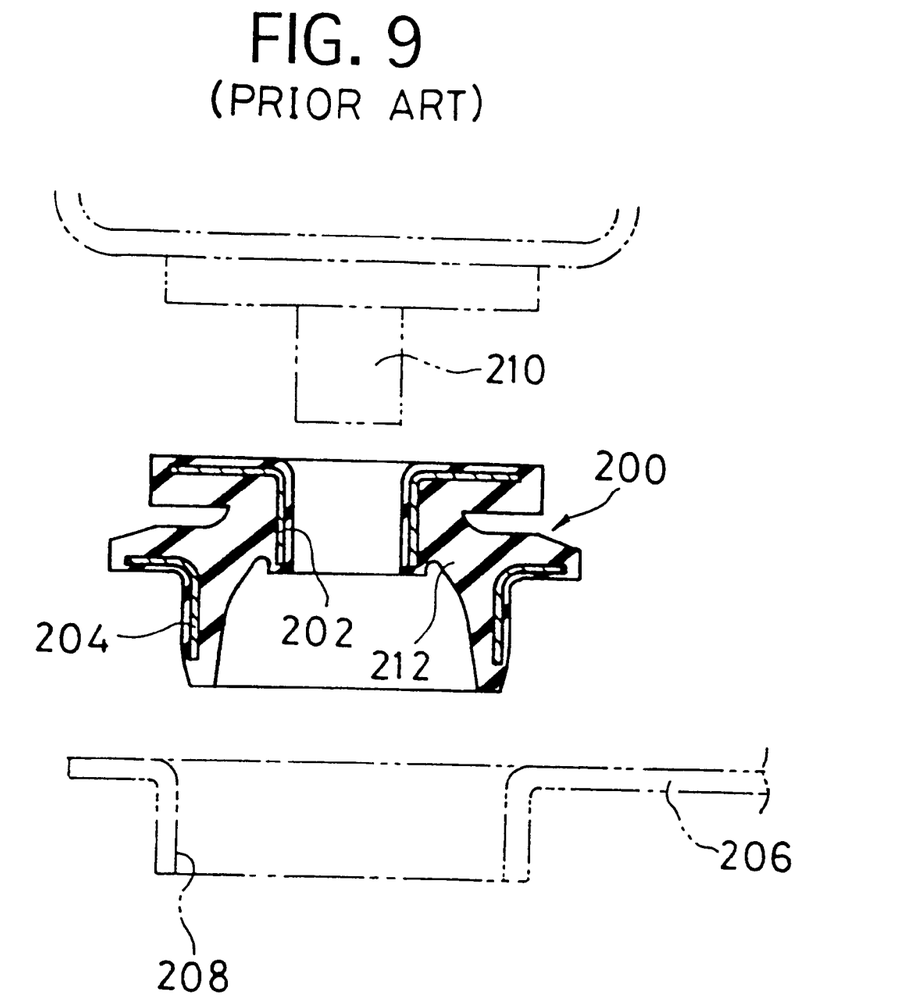
FIG. 9 illustrates a cross-sectional view of one of the conventional radiator supports together with mating members to be assembled therewith.

As shown in FIG. 9, the conventional radiator support includes a rubber-elastic member 200, an inner tube fitting 202, and an outer tube fitting 204. The inner tube fitting 202 is buried in an inner side of the rubber elastic member 200, and the outer tube fitting 204 is buried in an outer side thereof. The rigid inner and outer tube fittings 202 and 204 have a thickness of about 1.2 mm, respectively. The conventional radiator support is fitted into an engagement hole 208 of a vehicle-side installation member 206 at the outer peripheral end in which the outer tube fitting 204 is buried. Moreover, an engagement pin 210 extends downward from a radiator, and is fitted into the inner peripheral end of the conventional radiator support in which the inner tube fitting 202 is buried. Thus, the conventional radiator support is assembled between the radiator and the vehicle-side installation member 206.

In the conventional radiator support, the relative displacements between the vehicle-side installation member 206 and the radiator are absorbed mainly by the elastic deformations of an intermediate member 212 in the rubber-elastic member 200.

Based on the conventional radiator support, it is possible to think of modifying the conventional radiator support by employing a rigid inner tube member and a rigid outer tube member which are made from a resinous material, and by connecting the rigid inner tube member and the rigid outer tube member with a rubber-elastic member being interposed therebetween. If such is the case, it is possible to decrease the overall weight of the conventional radiator support, and at the same time to reduce the manufacturing cost thereof.

When producing the thus modified conventional radiator support, one can think of producing it in the following manner. Namely, the rubber-elastic member is molded independently in advance, the rubber-elastic member is set in a mold for molding a resinous product and a resinous material is injected into the mold with the rubber-elastic member set therein, thereby molding the rigid inner tube member and the rigid outer tube member, and simultaneously integrating the resultant rigid inner tube member and rigid outer tube member with the rubber-elastic member.

However, even if such a production process is possible, there arises problems. For instance, when a resinous material is injected into the mold with the rubber-elastic member simply set therein, the rubber-elastic member is not only put out of position in the mold, but is also deformed by the injection pressure of the resinous material. Accordingly, the rigid inner tube member and rigid outer tube member cannot be molded satisfactorily.

SUMMARY OF THE INVENTION

The present invention has been developed in order to solve the problems associated with the production process of the modified conventional radiator support.

A process for producing a radiator support according to the present invention can solve such problems. The present process is for producing a radiator support, disposed between a radiator and a vehicle-side installation member, and comprises the steps of:

molding a rubber-elastic member independently in advance, and thereby molding the rubber-elastic member so as to be substantially tube shaped, and to include an inner peripheral portion, an outer peripheral portion, opposite ends, and a rubber flange, the rubber flange being disposed at one of the opposite ends, and having a top surface and a bottom surface;

disposing the rubber-elastic member in a mold; and completing a radiator support by injecting a resinous material into the mold, thereby molding a rigid inner tube member and a rigid outer tube member integrally with the rubber-elastic member, the rigid inner tube member being molded so as to include an inner peripheral portion fixed to the inner peripheral portion of the rubber-elastic member, the rigid outer tube member being molded so as to include an outer peripheral portion, opposite ends, and a flange, the outer peripheral portion of the rigid outer tube member being fixed to the outer peripheral portion of the rubber-elastic member, the flange being molded so as to be disposed at one of the opposite ends of the outer tube member, to extend radially outward, to have a top surface and a bottom surface, the top surface of the flange of the rigid outer tube member being superimposed on the bottom surface of the rubber flange of the rubber-elastic member, and to have a cut-off, the cut-off being molded in the flange of the rigid outer tuber member so as to be disposed under and downwardly expose a portion of the bottom surface of the rubber flange of the rubber elastic-member in a completed radiator support, the downwardly-exposed portion being held by the mold, and disposed correspondingly to the cut-off of the flange of the rigid outer tube member in a completed radiator support.

The present production process can be modified so that, in the radiator support completing step, a plurality of the cut-offs can be molded partially at appropriate positions in the flange of the rigid outer tube member. Moreover, the modified present production process can be further modified so that, in the radiator support completing step, the cut-offs can be molded so as to be spaced at equal intervals in a circumferential direction of the flange of the rigid outer tube member in a completed radiator support.

In the present production process, the rigid outer tube member is molded so as to include the flange which has the cut-off at a predetermined portion in the radiator support completing step, and accordingly the bottom surface of the rubber flange of the rubber-elastic member is downwardly exposed at a portion which corresponds to the resulting cut-off of the flange of the rigid outer tube member in a completed radiator support. In the radiator support completing step, the rubber flange of the rubber-elastic member is held at the downwardly-exposed portion by the mold. Then, into the mold thus holding the rubber-elastic member, a resinous material is injected to mold the rigid outer tube member as well as the rigid inner tube member. Hence, in accordance with the present production process, it is possible to effectively inhibit the rubber-elastic member from being put out of position in the mold, and from being deformed by the injection pressure of the resinous material. As a result, it is possible to satisfactorily produce a radiator support.

Further, in the modified present production process, the rigid outer tube member can be molded to have a plurality of the cut-offs partially at appropriate positions in the flange. If such is the case, it is unnecessary to downwardly expose the bottom surface of the rubber flange of the rubber-elastic member all around the circumferential direction of the rubber flange of the rubber-elastic member. As a result, it is possible to diametrically decrease the rubber flange of the rubber-elastic member, and accordingly to reduce the material cost of the rubber-elastic member. In addition, it is possible to reduce the manufacturing cost for preparing a cavity for molding the rigid outer tube member in the mold.

Furthermore, in the modified present production process, the rigid outer tube member can preferably be molded to have a plurality of the cut-offs which are spaced at equal intervals in the circumferential direction of the flange of the rigid outer tube member in a completed radiator support. If such is the case, not only it is unnecessary to downwardly expose the bottom surface of the rubber flange of the rubber-elastic member all around the circumferential direction of the rubber flange of the rubber elastic member, but also it is possible to evenly hold the rubber-elastic member as a whole by the mold. When employing this arrangement, it is preferred to dispose the cut-off at a plurality of positions (e.g., at three positions at least) which are spaced at equal intervals in the circumferential direction of the flange of the rigid outer tube member in a completed radiator support.

Not contradicting with the above-described preferred arrangements, in the present production process, the rigid outer tube member can be molded so as to downwardly expose the bottom surface of the rubber flange of the rubber-elastic member entirely at an outer peripheral end all around a circumferential direction of the rubber flange of the rubber-elastic member in a completed radiator support: namely; the flange of the rigid outer tube member can be molded so as to have an outside diameter smaller than an outside diameter of the rubber flange of the rubber-elastic member. If such is the case, the rubber-elastic member can be held firmly at all around the rubber flange by the mold. As a result, the rubber-elastic member can be less likely to be exposed dimensionally in the directions perpendicular to the axial direction (i.e., in radial directions), and accordingly can be less likely to be adversely affected by the injection pressure of the resinous material. Moreover, if such is the case, it is possible to simplify the design of a cavity for molding the rigid outer tube member in the mold.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in detail with reference to a radiator support which is produced by a production process according to a preferred embodiment of the present invention.

Figure 3:
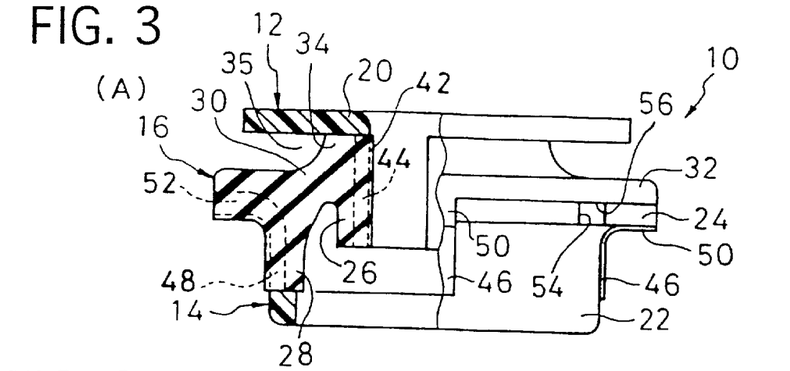
FIG. 3A illustrates a side view of the radiator support illustrated in FIG. 1 partially in cross-section, and taken along the line 3A—3A of FIG. 3C.
FIG. 3B illustrates a cross-sectional view of the radiator support illustrated in FIG. 1, and taken along the line 3B—3B of FIG. 3C.
FIG. 3C illustrates a bottom view of the radiator support illustrated in FIG. 1.
Figure 4:
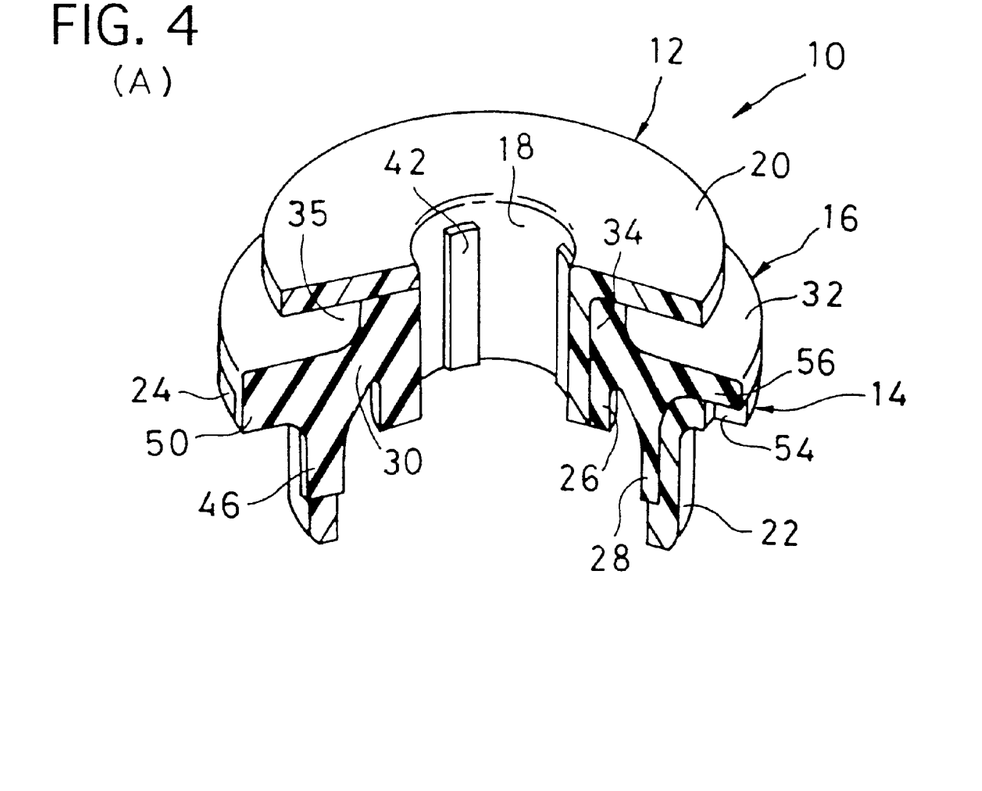
FIG. 4A illustrates a partially cut-away perspective view of the radiator support illustrated in FIGS. 1 through 3.
FIG. 4B illustrates a partially cut-away perspective view of an independent rubber-elastic member of the radiator support illustrated in FIGS. 1 through 3.
Figure 5A:
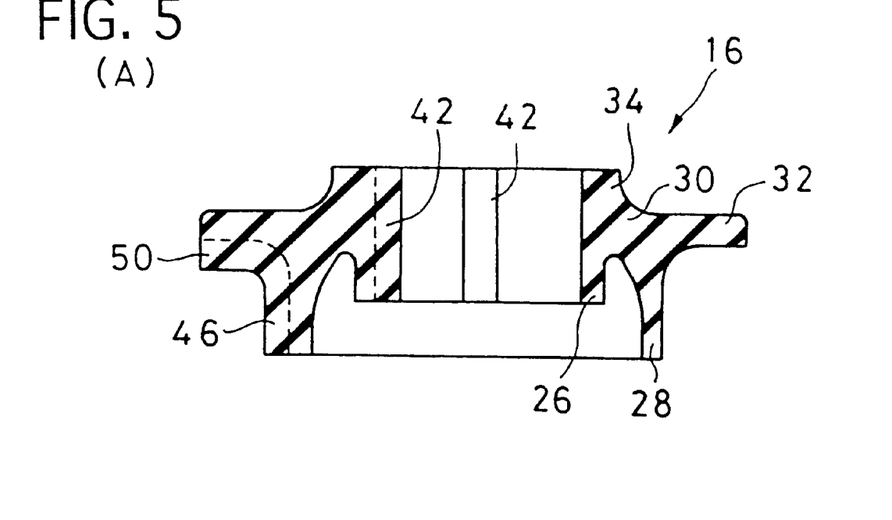
FIG. 5A illustrates a cross-sectional view of the rubber-elastic member illustrated in FIG. 4B, and taken along the line 5A—5A of FIG. 5B.
Figure 5B:
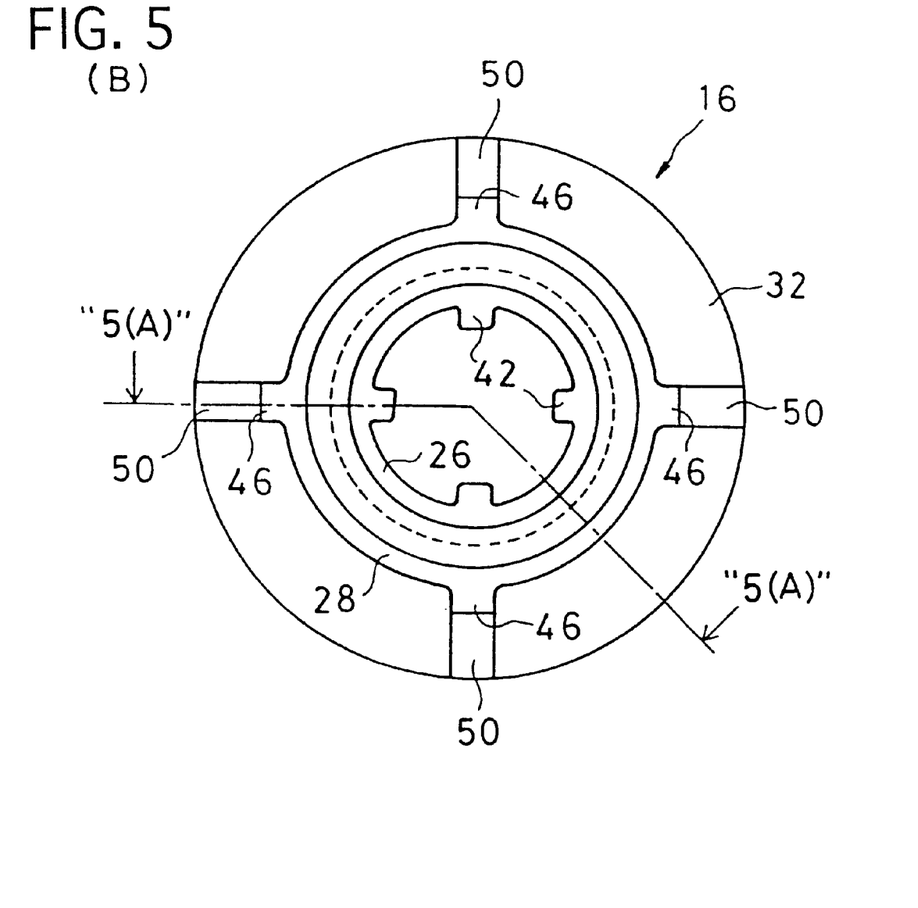
FIG. 5(B) illustrates a bottom view of the rubber-elastic member illustrated in FIG. 4B.

In FIGS. 1, 3 and 4, the radiator support is designated at 10, and includes a rigid inner tube member 12 made from a resin, a rigid outer tube member 14 made from a resin, and an intermediate rubber-elastic member 16. In this preferred embodiment, both of the rigid inner tube member 12 (hereinafter abbreviated to "inner tube member 12") and the rigid outer tube member 14 (hereinafter abbreviated to "outer tube member 14") are made from a polyamide resin (PA). The rubber-elastic member 16 is disposed between the inner tube member 12 and the outer tube member 14 to connect them, and is made from a natural rubber (NR).

Figure 1A:
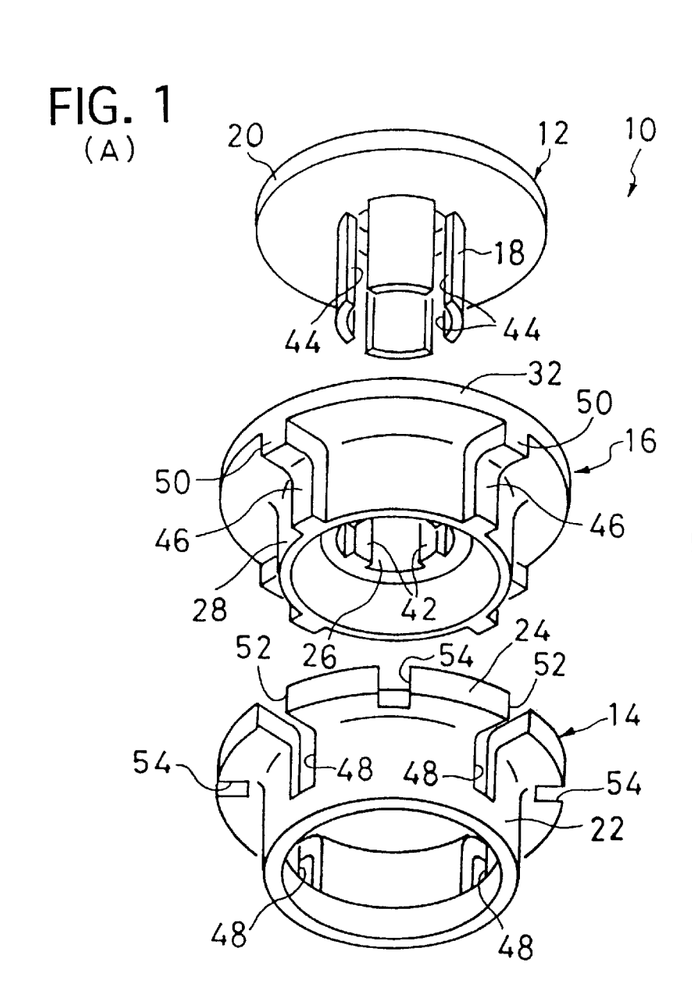
FIG. 1A illustrates an exploded view of a radiator support which is produced by a production process according to a preferred embodiment of the present invention.

As illustrated in FIG. 1A, the inner tube member 12 has a cylinder-shaped portion 18, and a flange 20. The flange 20 is disposed at the top end of the cylinders-shaped portion 18, and extends outwardly in radial directions.

The outer tube member 14 has a cylinder-shaped portion 22, and a flange 24. The cylinder-shaped portion 22 has an inside diameter larger than an outside diameter of the cylinder-shaped portion 18 of the inner tube member 12. The flange 24 is disposed at the top end of the cylinder-shaped portion 22, and extends outwardly in radial directions.

The rubber-elastic member 16 has an inner cylinder-shaped portion 26, an outer cylinder-shaped portion 28, and an intermediate portion 30 (shown in FIGS. 3A and 3B). The inner cylinder-shaped portion 22 is formed so as to surround the cylinder-shaped portion 18 of the inner tube member 12. The outer cylinder-shaped tube portion 28 is formed so as to be placed inside the cylinder-shaped portion 22 of the outer tube member 14. The intermediate portion 30 works as a connector for connecting the inner cylinder-shaped portion 26 and the outer cylinder-shaped portion 28. Note that, as illustrated in FIGS. 3A and 3B, the intermediate portion 30 is inclined upwardly from the outer peripheral side to the inner peripheral side.

Further, the rubber-elastic member 16 has a radially-outwardly extending rubber flange 32, and an upwardly-extending projection 34 (shown in FIGS. 3A and 3B). The upwardly-extending projection 34 is disposed on an inner peripheral side of the rubber-elastic member 16, and projects upwardly. When the rubber flange 32 is superimposed on a top surface of the flange 24 of the outer tube member 14, the top end of the upwardly-extending projection 34 is brought into contact with the bottom surface of the flange 20 of the inner tube member 12. Note that, as illustrated in FIGS. 3A and 3B, there is formed an annular clearance 35 between the flange 20 of the inner tube member 20 and the rubber flange 32 of the rubber-elastic member 16.

Furthermore, as illustrated in FIGS. 4A and 4B, the rubber-elastic member 16 has a plurality of inwardly-extending convexities 42 formed integrally on the inner peripheral surface of the inner cylinder-shaped portion 26. The inwardly-extending convexities 42 stretch over the entire height of the inner peripheral surface of the inner-cylinder-shaped portion 26 of the rubber-elastic member 16, and project from the inner peripheral surface of the inner tube member 12 to the inner space thereof by a predetermined dimension via a plurality of slit-shaped cut-offs 44 (shown in FIG. 1A). The slit-shaped cut-offs 44 are formed in the inner tube member 12 at positions corresponding to the inwardly-extending convexities 42 of the rubber-elastic member 16, and work as the above-described through con-cavity.

As illustrated in FIG. 3C, the inwardly-extending convexities 42 and the slit-shaped cut-offs 44 are formed at four positions in the circumferential direction of the rubber-elastic member 16 and the inner tube member 12, respectively. Note that the four positions are spaced equally at intervals of 90 degrees.

Moreover, as illustrated in FIG. 1A, and FIGS. 4A and 4B, the rubber-elastic member 16 has a plurality of outwardly-extending convexities 46 formed integrally on the outer peripheral surface of the outer cylinder-shaped portion 28. The outwardly-extending convexities 46 project outwardly from the outer peripheral surface of the outer cylinder-shaped portion 28, and further project from the outer peripheral surface of the outer tube member 14 by a predetermined dimension via a plurality of slit-shaped cut-offs 48 (shown in FIGS. 1A and 1B). The slit-shaped cut-off is 48 are formed in the outer tube member 14 at positions corresponding to the outwardly-extending convexities 46 of the rubber-elastic member 16.

As illustrated in FIG. 3C, the outwardly-extending convexities 46 and the slit-shaped cut-offs 48 are formed at four positions in the circumferential direction of the rubber-elastic member 16 and the outer tube member 14, respectively. Note that the four positions are spaced equally at intervals of 90 degrees.

In addition, as illustrated in FIG. 1A, and FIGS. 3A, 3B and 3C, the rubber-elastic member 16 has a plurality of downwardly-extending convexities 50 formed integrally on the bottom surface of the rubber flange 32. The downwardly-extending convexities 50 project downwardly from the bottom surface of the flange 24 of the outer tube member 14 by a predetermined dimension via a plurality of cut-offs 52 (shown in FIGS. 1A and 1B). The cut-offs 52 are formed in the flange 24 of the outer tube member 14 at positions corresponding to the downwardly-extending convexities 50 of the rubber-elastic member 16.

Note that, as illustrated in FIG. 1A, a plurality of the downwardly-extending convexities 50 and the cut-offs 52 are formed continuously from the outwardly-extending convexities 46 and the slit-shaped cut-offs 48, respectively.

Figure 1B:
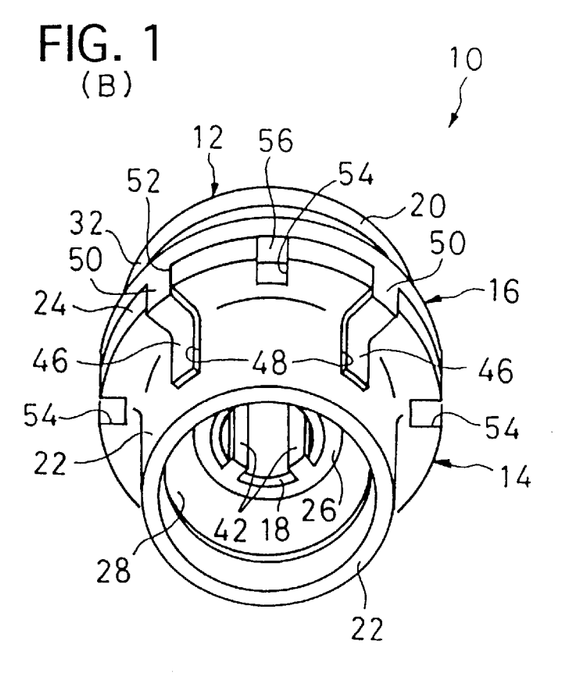
FIG. 1B illustrates a perspective view of the radiator support.

As illustrated in FIGS. 1A and 1B, and FIG. 3C, in the radiator support 10 which is produced by a production process according to a preferred embodiment of the present invention, the outer tube member 14 further has four cut-offs 54 in the flange 24. The cut-offs 54 are placed respectively at four positions between the cut-offs 52 into which the downwardly-extending convexities 50 are fitted. Note that the four positions are spaced equally at intervals of 90 degrees in the circumferential direction. The cut-offs 54 are formed as a rectangle in a planar configuration, and have a shallow depth: namely; they have a radial depth which does not reach the outer peripheral end of the cylinder-shaped portion 22. With this arrangement, it is possible to inhibit a mold from damaging the outer cylinder-shaped portion 28 of the rubber-elastic member 16 in the molding of the inner tube member 12 and the outer tube member 14. Thus, the bottom surface of the rubber flange 32 of the rubber-elastic member 16 is exposed downwardly at portions corresponding to the cut-offs 54 of the outer tube member 14. The portions of the rubber flange 32 corresponding to the cut-offs 54 work as holdable ends 56 which can be held by mold halves during the injection molding of the inner tube member 12 and the outer tube member 14 described later.

Figure 2:
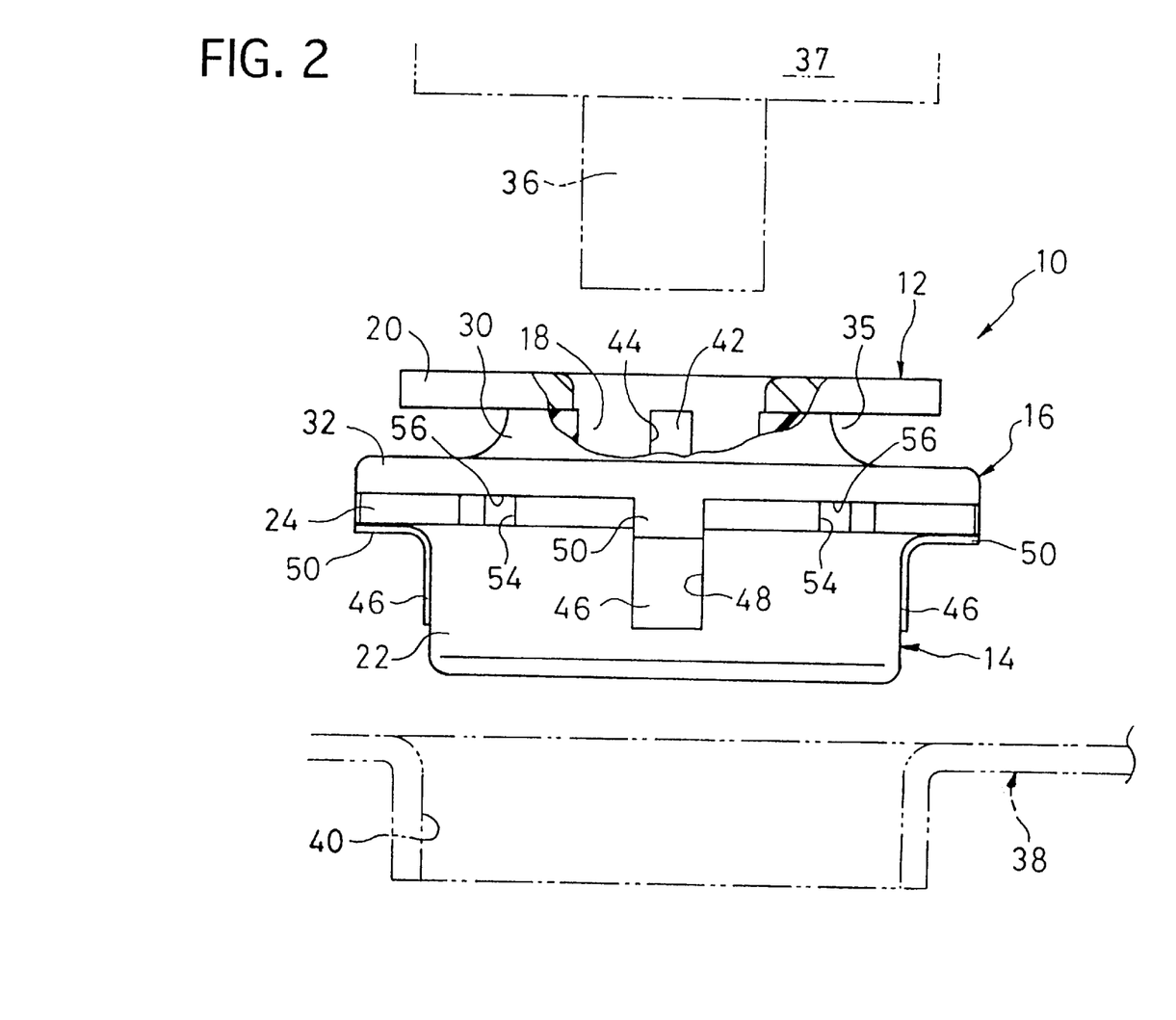
FIG. 2 is an external view of the radiator support illustrated in FIG. 1 together with mating members to be assembled therewith.

The radiator support 10 which is produced by a production process according to a preferred embodiment of the present invention is assembled between a vehicle-side installation member 38 and a radiator 37 in the following manner: namely; as illustrated in FIG. 2, a downwardly-extending engagement pin 36 of the radiator 37 is fitted into the inner tube member 12; and the outer tube member 14 is fitted into an engagement hole 40 of the vehicle-side installation member 38. In this example, the engagement pin 36 is made from a resin, and the vehicle-side installation member 38 is made from a metal.

The thus assembled radiator support 10 absorbs the vertical relative displacements between the radiator 37 and the vehicle-side installation member 38 mainly by the vertical shearing elastic deformations of the intermediate member 30 in the rubber-elastic member 16.

The vertical relative displacements can be received securely by the annular clearance 35 which is formed between the flange 20 of the inner tube member 12 and the rubber flange 32 of the rubber-elastic member 16. When the magnitude of the vertical relative displacements is a predetermined value or more, the flange 20 of the inner tube member 12, and the rubber flange 32 of the rubber-elastic member 16 are brought into contact with each other to inhibit the excessive deformations of the intermediate member 30 in the rubber-elastic member 16. Thus, the rubber flange 32 works as a stopper for inhibiting the vertical relative displacements from enlarging excessively.

The radiator support 10 can be readily produced by a production process according to a preferred embodiment of the present invention as follows: namely; the rubber-elastic member 16 is molded independently in advance, and set in a mold for molding the inner tube member 12 and the outer tube member 14; and the inner tube member 12 and the outer tube member 14 are injection-molded by injecting a resinous material into the mold with the rubber-elastic member 16 set therein.

Figure 6:
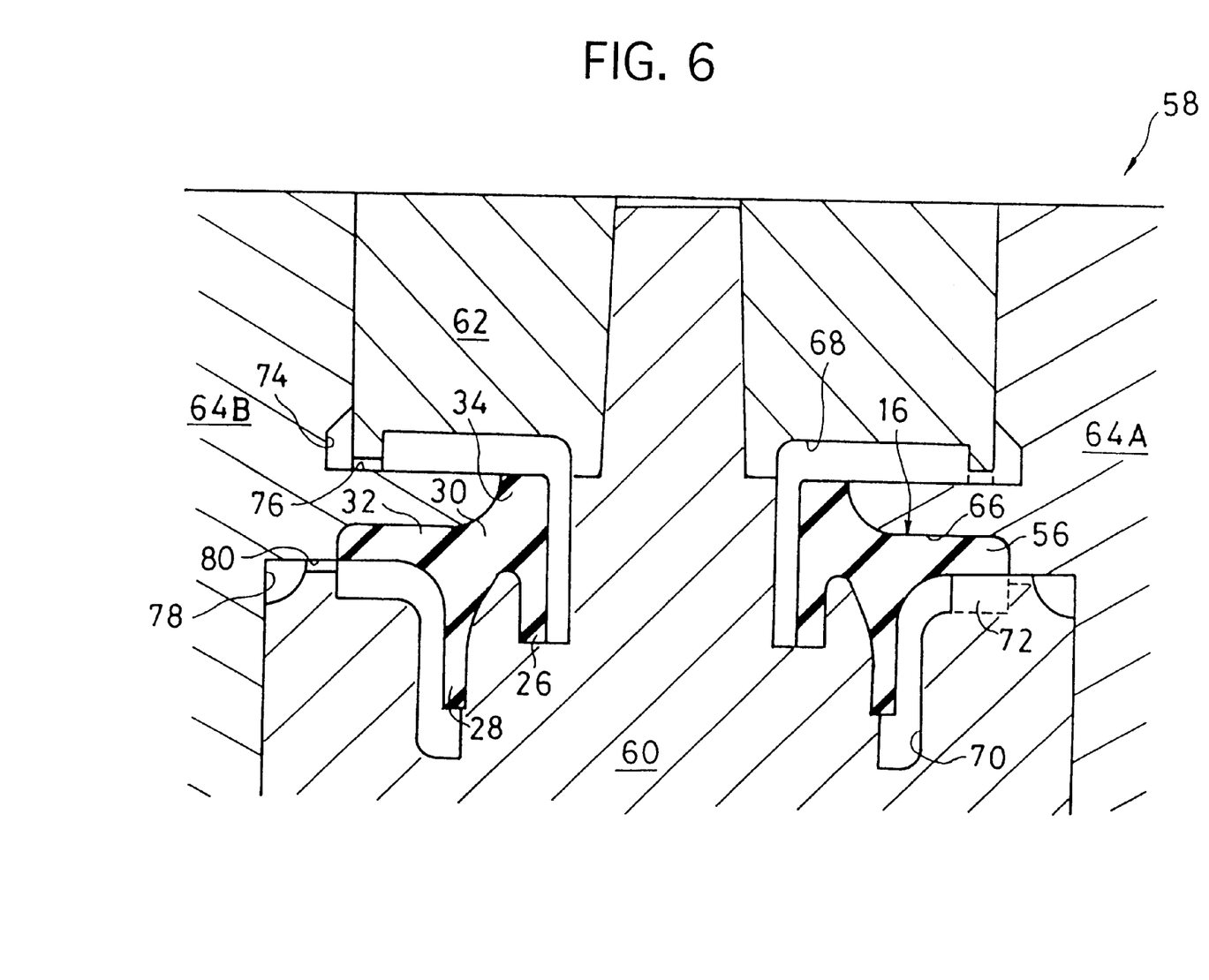
FIG. 6 illustrates how the radiator support illustrated in FIGS. 1 through 3 is produced by the production process according to the preferred embodiment.

FIG. 6 illustrates the manufacturing process of the radiator support 10 specifically. In the drawing, a mold for molding a resinous product is designated at 58. The mold 58 includes an upper mold half 62, a lower mold half 60, a right-hand-side split mold 64A, and a left-hand-side split mold 64B. Moreover, in the mold 58, there are formed a space 66 for setting the rubber-elastic member 16, a cavity 68 for molding the inner tube member 12, and a cavity 70 for molding the outer tube member 14.

The space 66 for setting the rubber-elastic member 16, the cavity 68 for molding the inner tube member 12, and the cavity 70 for molding the outer tube member 14 are spaces which are communicated with each other. Moreover, the lower mold half 60 is provided with grips 72. The grips 72 hold the holdable ends 56 of the rubber-elastic member 16 cooperatively with the right-hand-side and left-hand-side split molds 64A and 64B. Note that the grips 72 have the same configuration as that of the cut-off 54 of the outer tube member 14. Also note that the grips 72 work as portions for molding the cut-offs 54 in the flange 24 of the outer tube member 14.

In this exemplary manufacturing process, the rubber-elastic member 16 is subjected to an adhesive application in advance, and is set in the space 66. When the rubber-elastic member 16 is set, the rubber-elastic member 16 is held at the holdable ends 56 by the right-hand-side and left-hand-side split molds 64A and 641B, and by the grips 72 of the lower mold half 60. Thus, the rubber-elastic member 16 is kept cramped at a fixed position.

Under the aforementioned circumstance, a molten resinous material is injected into the space 68 by way of a passage 74 and a gate 76, and is injected into the space 70 by way of an annular passage 78 and a gate 80 as well. The inner tube member 12 and the outer tube member 14 are molded by curing the molten resinous material, and are simultaneously integrated with the rubber-elastic member 16. Thus, the radiator support 10 can be prepared with ease.

When the inner tube member 12, and the outer tube member 14 are molded, the slit-shaped cut-offs 44, 48, and 52 are molded simultaneously. As a result, the inwardly-extending projections 42, the outwardly-extending projections 46, and the downwardly-extending projections 50 of the rubber-elastic member 16 can be projected respectively from the cut-offs 44, 48, and 52 inwardly, outwardly, and downwardly.

As described above, in a production process according to a preferred embodiment of the present invention, the outer tube member 14 is molded so as to include the cut-off 54 at predetermined positions in the flange 24. Accordingly, the rubber-elastic member 16 is downwardly exposed at the positions, corresponding to the cut-offs 54, in the rubber flange 32. Thus, the rubber-elastic member 16 can be held by the mold 56 at the positions in the rubber flange 32. Into the mold 56 thus holding the rubber-elastic member 16, a resinous material is injected to mold and integrate the inner tube member 12 and the outer tube member 14 with the rubber-elastic member 16. Hence, in accordance with the production process, it is possible to inhibit the rubber-elastic member 16, which has been set properly in the mold 56, from being put out of position in the mold 56 by the injection pressure, and from being deformed by the injection pressure when the resinous material is injected to mold the inner tube member 12 and the outer tube member 14. As a result, it is possible to satisfactorily complete the radiator support 10.

Figure 7:
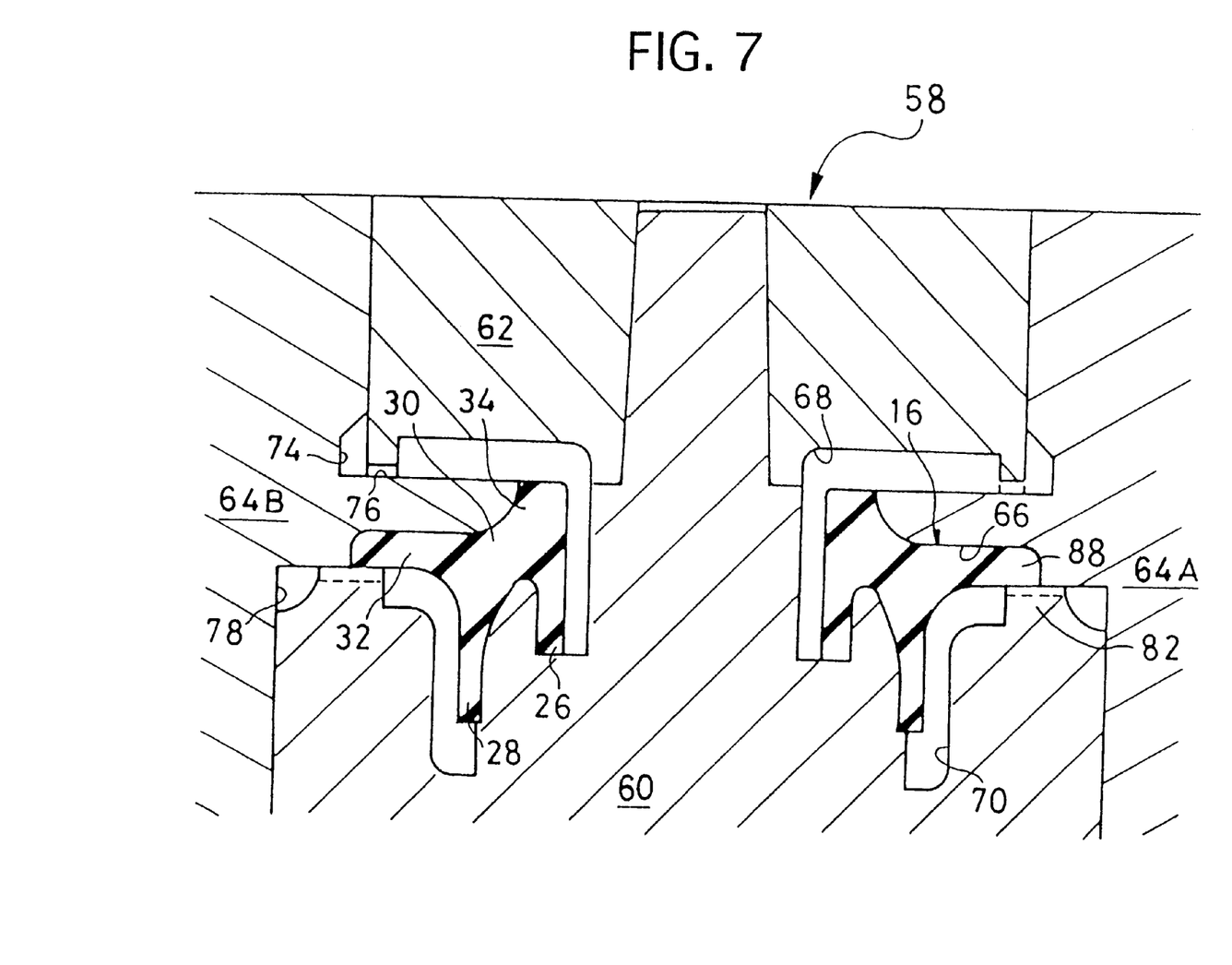
FIG. 7 illustrates how a radiator support is produced by a modified version of the preferred embodiment, modified version which differs from the production process illustrated in FIG. 6.
Figure 8:
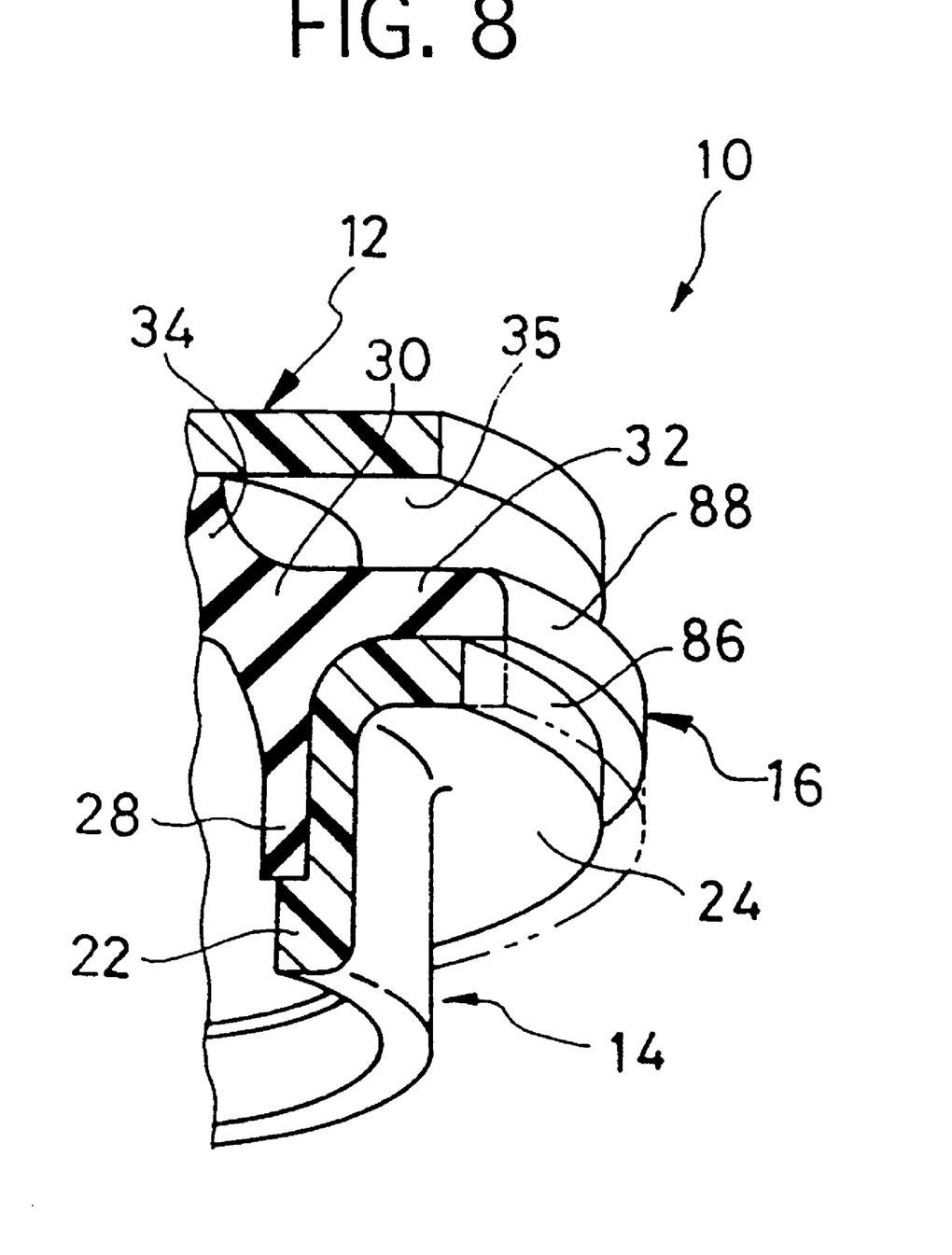
FIG. 8 illustrates a partially cut-away perspective view of the radiator support which is produced by the modified version illustrated in FIG. 7.

In the above-described production process according to a preferred embodiment of the present invention, the outer tube member 14 is molded so as to include the cut-off 54 which is disposed at four predetermined positions in the flange 24 in the circumferential direction thereof, and accordingly the rubber-elastic member 16 can be held by the mold 56 at the four positions which are disposed correspondingly to the cut-offs 54 in the flange 24 of the outer tube member 14 in the completed radiator support 10. Note that, however, the production process can be modified as follows: namely; as illustrated in FIG. 8, the outer tube member 14 can be molded so that the flange 24 is removed to form a cut-off 86 at the outer peripheral end all around the circumferential direction. Accordingly, in the completed radiator support 10 illustrated in FIG. 8, the bottom surface of the rubber flange 32 of the rubber-elastic member 16 can be downwardly exposed at the outer peripheral portion entirely, and the whole outer peripheral portion of the bottom surface of the rubber flange 32 can be employed as an annular mold-receiving portion 88 which is disposed correspondingly to the all-around cut-off 86 in the flange 24 of the outer tube member 14. Hence, as illustrated in FIG. 7, the rubber-elastic member 16 can be held at all around the annular mold-receiving portion 88 in the rubber flange 32 by a holding member 82 which is formed in the lower mold 60. Then, into the mold 56 thus holding the rubber-elastic member 16, a resinous material can be injected to mold and integrate the inner tube member 12 and the outer tube member 14 with the rubber-elastic member 16.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a radiator support, disposed between a radiator and a vehicle-side installation member, the process comprising the steps of:

molding a rubber-elastic member independently in advance, thereby molding the rubber-elastic member so as to be substantially tube-shaped and to include an inner peripheral portion, an outer peripheral portion, opposite ends, and a rubber flange, the rubber flange being disposed at one of the opposite ends, and the rubber flange having a top surface and a bottom surface;

disposing the rubber-elastic member in a mold so that a bottom portion of the flange of the rubber-elastic member is held by a grip portion of the mold; and completing a radiator support by injecting a resinous material into the mold and around the grip portion so as to form a cut-off, thereby molding a rigid inner tube member and a rigid outer tube member integrally with the rubber-elastic member, the rigid inner tube member being molded so as to include an inner peripheral portion fixed to the inner peripheral portion of the rubber-elastic member, the rigid outer tube member being molded so as to include an outer peripheral portion, opposite ends, and a flange, the outer peripheral portion of the rigid outer tube member being fixed to the outer peripheral portion of the rubber-elastic member, the flange of the rigid outer tube member being molded so as to be disposed at one of the opposite ends of the rigid outer tube member, to extend radially outward, to have a top surface and a bottom surface, the top surface of the flange of the rigid outer tube member being superimposed on the bottom surface of the rubber flange of the rubber-elastic member, and the flange of the rigid outer tube member being molded so as to form said cut-off, the cut-off being located on the flange of the rigid outer tube member so as to expose a portion of the bottom surface of the rubber flange of the rubber-elastic member to form the radiator support.

2. The process according to claim 1, wherein, in said radiator support completing step, a plurality of the cut-offs are molded/partially at appropriate positions in the flange of the rigid outer tube member.

3. The process according to claim 2, wherein, in said radiator support completing step, the cut-offs are molded so as to be spaced at equal intervals in a circumferential direction of the flange of the rigid outer tube member in a completed radiator support.

4. The process according to claim 1, wherein, in said radiator support completing step, the cut-off is formed as a rectangle in a planar configuration in the flange of the rigid outer tube member.

5. The process according to claim 1, wherein, in said radiator support completing step, the cut-off is formed to have a radial depth which is short of an outer peripheral end of the flange of the rigid outer tube member.

6. The process according to claim 1, wherein, in said radiator support completing step, the rubber-elastic member is held at the downwardly-exposed portion by a grip which the mold is provided with, and which works to mold the cut-off in the flange of the rigid outer tube member in a completed radiator support.

7. The process according to claim 6, wherein, in said radiator support completing step, the cut-off is molded by the grip which has an identical configuration with that of the cut-off.

8. The process according to claim 1, wherein, in said radiator support completing step, the rigid outer tube member is molded so as to have a cut-off in the flange, the cut-off exposing the bottom surface of the rubber flange of the rubber-elastic member entirely at an outer peripheral end all around a circumferential direction of the rubber flange of the rubber-elastic member in a completed radiator support.

9. The process according to claim 1, wherein:
in said rubber-elastic member molding step, the rubber-elastic member is molded to include a convexity which is formed on the inner peripheral portion of the rubber-elastic member, and which extends inward; and
in said radiator support completing step, the rigid inner tube member is molded to include a radial through concavity which is formed through the inner peripheral portion of the rigid inner tube member in a radial direction thereof, into which the convexity of the rubber-elastic member is fitted, and from which the convexity of the rubber-elastic member is projected inward by a predetermined length.

10. The process according to claim 9, wherein:
in said rubber-elastic member molding step, a plurality of the convexities are formed on the inner peripheral portion of the rubber-elastic member; and in said radiator support completing step, a plurality of the radial through concavities are formed through the inner peripheral portion of the rigid inner tube member.

11. The process according to claim 10, wherein:
in said rubber-elastic member molding step, a plurality of the convexities are spaced at equal intervals in a circumferential direction of the inner peripheral portion of the rubber-elastic member; and
in said radiator support completing step, a plurality of the radial through concavities are spaced at equal intervals in a circumferential direction of the inner peripheral portion of the rigid inner tube member.

12. The process according to claim 1, wherein:
in said rubber-elastic member molding step, the rubber-elastic member is molded to include a convexity which is formed on the outer peripheral portion of the rubber-elastic member, and which extends outward; and
in said radiator support completing step, the rigid outer tube member is molded to include a radial through concavity which is formed through the outer peripheral portion of the rigid outer tube member in a radial direction thereof, into which the convexity of the rubber-elastic member is fitted, and from which the convexity of the rubber-elastic member is projected outward by a predetermined length.

13. The process according to claim 12, wherein:
in said rubber-elastic member molding step, a plurality of the convexities are formed on the outer peripheral portion of the rubber-elastic member; and
in said radiator support completing step, a plurality of the radial through concavities are formed through the outer peripheral portion of the rigid outer tube member.

14. The process according to claim 13, wherein:
in said rubber-elastic member molding step, a plurality of the convexities are spaced at equal intervals in a circumferential direction of the outer peripheral portion of the rubber-elastic member; and
in said radiator support completing step, a plurality of the radial through concavities are spaced at equal intervals in a circumferential direction of the outer peripheral portion of the rigid outer tube member.

15. The process according to claim 1, wherein:
in said rubber-elastic member molding step, the rubber-elastic member is molded to include a first convexity which is formed on the inner peripheral portion of the rubber-elastic member, and which extends inward, and a second convexity which is formed on the outer peripheral portion of the rubber-elastic member, and which extends outward; and
in said radiator support completing step, the rigid inner tube member is molded to include a first radial through concavity which is formed through the inner peripheral portion of the rigid inner tube member, in a radial direction thereof, into which the first convexity of the rubber-elastic member is fitted, and from which the first convexity of the rubber-elastic member is projected inward by a predetermined length, and the rigid outer tube member is molded to include a second radial through concavity which is formed through the outer peripheral portion of the rigid outer tube member in a radial direction thereof, into which the second convexity of the rubber-elastic member is fitted, and from which the second convexity of the rubber-elastic member is projected outward by a predetermined length.

16. The process according to claim 15, wherein:

in said rubber-elastic member molding step, a plurality of the first convexities are formed on the inner peripheral portion of the rubber-elastic member, and a plurality of the second convexities are formed on the outer peripheral portion thereof; and in said radiator support completing step, a plurality of the first radial through concavities are formed through the inner peripheral portion of the rigid inner tube member, and a plurality of the second radial through concavities are formed through the outer peripheral portion of the rigid outer tube member.

17. The process according to claim 16, wherein:

in said rubber-elastic member molding step, a plurality of the first convexities are spaced at equal intervals in a circumferential direction of the inner peripheral portion of the rubber-elastic member, and a plurality of the second convexities are spaced at equal intervals in a circumferential direction of the outer peripheral portion thereof; and in said radiator support completing step, a plurality of the first radial through concavities are spaced at equal intervals in a circumferential direction of the inner peripheral portion of the rigid inner tube member, and a plurality of the second radial through concavities are spaced at equal intervals in a circumferential direction of the outer peripheral portion of the rigid outer tube member.

18. The process according to claim 1, wherein:

in said rubber-elastic member molding step, the rubber-elastic member is molded to include a convexity which is formed on the bottom surface of the rubber flange of the rubber-elastic member, and which extends downward; and in said radiator support completing step, the rigid outer tube member is molded to include an axial through concavity which is formed through the flange of the rigid outer tube member in an axial direction thereof, into which the convexity of the rubber-elastic member is fitted, and from which the convexity of the rubber-elastic member is projected downward by a predetermined length.

19. The process according to claim 18, wherein:

in said rubber-elastic member molding step, a plurality of the convexities are formed on the bottom surface of the rubber flange of the rubber-elastic member; and in said radiator support completing step, a plurality of the axial through concavities are formed through the flange of the rigid outer tube member.

20. The process according to claim 19, wherein:

in said rubber-elastic member molding step, a plurality of the convexities are spaced at equal intervals in a circumferential direction of the rubber flange of the rubber-elastic member; and in said radiator support completing step, a plurality of the axial through concavities are spaced at equal intervals in a circumferential direction of the flange of the rigid outer tube member.

21. The process according to claim 1, wherein:

in said rubber-elastic member molding step, the rubber-elastic member is molded to include a first convexity which is formed on the outer peripheral portion of the rubber-elastic member, and which extends outward, and a second convexity which is formed on the bottom surface of the rubber flange of the rubber-elastic member, and which extends downward; and in said radiator support completing step, the rigid outer tube member is molded to include a radial through concavity which is formed through the outer peripheral portion of the rigid outer tube member, in a radial direction thereof, into which the first convexity of the rubber-elastic member is fitted, and from which the first convexity of the rubber-elastic member is projected outward by a predetermined length, and an axial through concavity which is formed through the flange of the rigid outer tube member in a radial direction thereof, into which the second convexity of the rubber-elastic member is fitted, and from which the second convexity of the rubber-elastic member is projected downward by a predetermined length.

22. The process according to claim 21, wherein:

in said rubber-elastic member molding step, a plurality of the first convexities are formed on the outer peripheral portion of the rubber-elastic member, and a plurality of the second convexities are formed on the bottom surface of the rubber flange of the rubber-elastic member, and in said radiator support completing step, a plurality of the radial through concavities are formed through the outer peripheral portion of the rigid outer tube member, and a plurality of the axial through concavities are formed through the flange of the rigid outer tube member.

23. The process according to claim 22, wherein:

in said rubber-elastic member molding step, a plurality of the first convexities are spaced at equal intervals in a circumferential direction of the outer peripheral portion of the rubber-elastic member, and a plurality of the second convexities are spaced at equal intervals in a circumferential direction of the rubber flange of the rubber-elastic member, and in said radiator support completing step, a plurality of the radial through concavities are spaced at equal intervals in a circumferential direction of the outer peripheral portion of the rigid outer tube member, and a plurality of the axial through concavities are spaced at equal intervals in a circumferential direction of the flange of the rigid outer tube member.

24. The process according to claim 21, wherein:

in said rubber-elastic member molding step, the second convexity is formed continuously from the first convexity; and in said radiator support completing step, the axial through concavity is formed continuously from the radial through concavity.

* * * * *